United States Patent [19]
Kita

[11] Patent Number: 5,232,785
[45] Date of Patent: Aug. 3, 1993

[54] VIBRATION DAMPING SHEET

[75] Inventor: Masami Kita, Hyogo, Japan

[73] Assignee: Daicel-Hüls Ltd., Tokyo, Japan

[21] Appl. No.: 927,191

[22] Filed: Aug. 7, 1992

Related U.S. Application Data

[63] Continuation of Ser. No. 538,122, Jun. 14, 1990, abandoned.

[51] Int. Cl.⁵ ............... B32B 15/04; B32B 15/08
[52] U.S. Cl. ............................. 428/457; 428/245; 428/246; 428/355; 428/369; 428/415; 428/416; 428/462; 524/521; 524/448; 524/449; 524/501
[58] Field of Search ........... 428/369, 245, 355, 462, 428/416, 246, 415, 457; 524/521, 449, 445, 501

[56] References Cited

U.S. PATENT DOCUMENTS 3,826,862  7/1974  Terumichi ..................... 428/369

FOREIGN PATENT DOCUMENTS

01291930-A  11/1989  Japan .

Primary Examiner—Paul J. Thibodeau
Assistant Examiner—Leszek Kiliman
Attorney, Agent, or Firm—Flynn, Thiel, Boutell & Tanis

[57] ABSTRACT

A vibration damping sheet comprises two sheets of metal and an intermediate layer inserted between the two sheets of metal. The intermediate layer comprises a rubber composition comprising a butyl rubber, polyoctenylene and a copolymer of an olefin and an epoxy-containing acrylic ester.

10 Claims, 2 Drawing Sheets

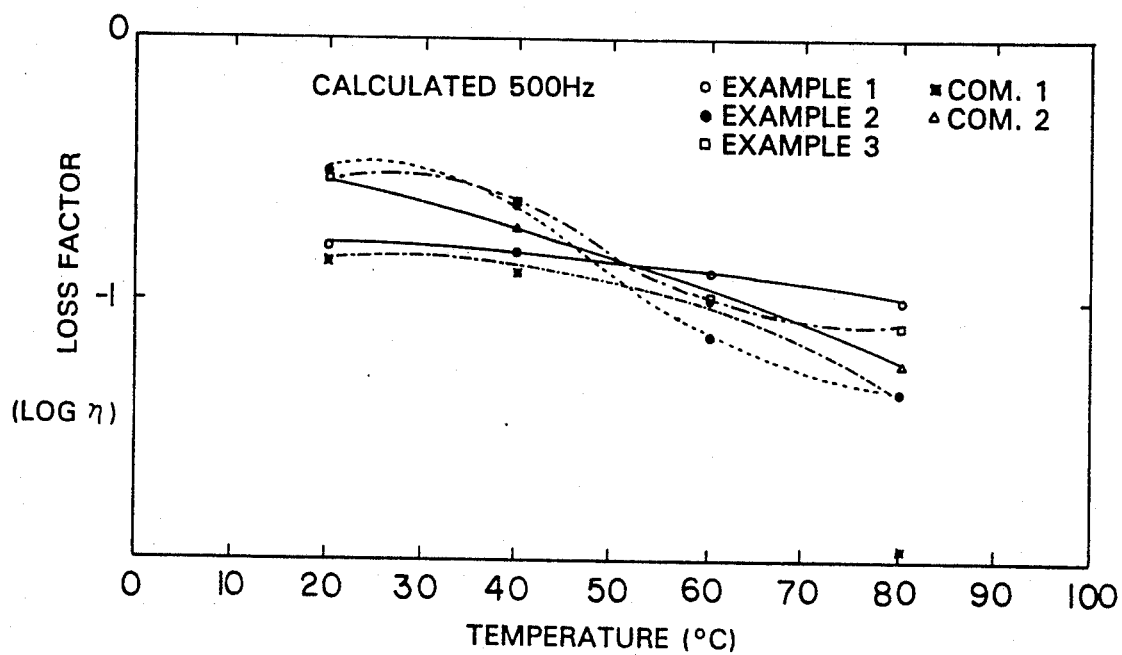
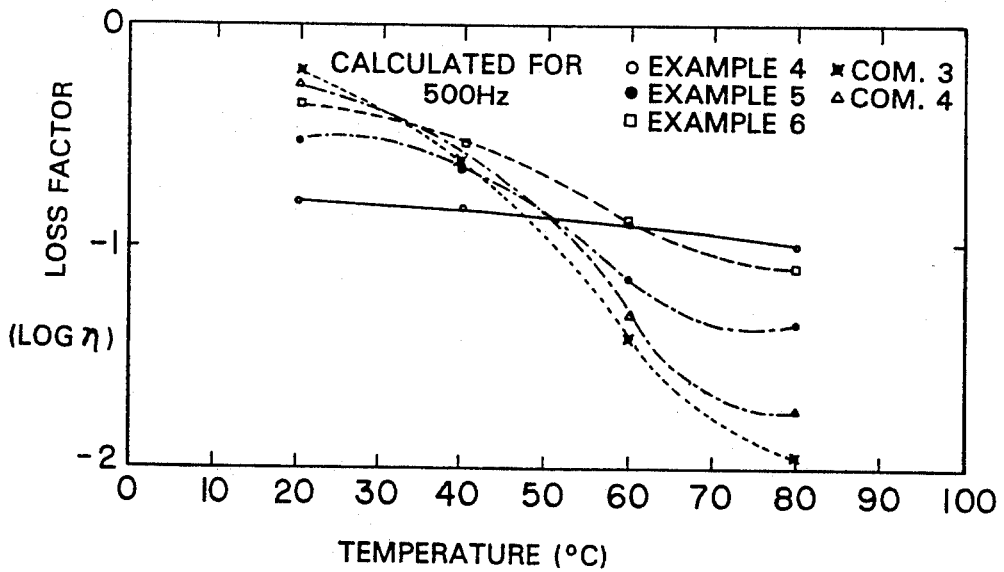

VIBRATION DAMPING SHEET

This application is a continuation of U.S. Ser. No. 07/538,122, filed Jun. 14, 1990, now abandoned.

The present invention relates to a vibration damping composite metallic sheet which comprises two sheets of metal and an intermediate layer inserted between the two sheets of metal. A rubber-based resin composition in film or sheet form, which comprises a butyl rubber, a copolymer of an olefin and an., acrylic ester and a polyoctenylene resin and, having blended therewith, a copolymer of an olefin and an epoxy-containing acrylic ester, and which has a vibration damping capability over a wide temperature range is used to adhere the two sheets of metal.

PRIOR ART

In recent years, with an increasing tightening of noise regulations for housing, automobiles, etc., various methods have been studied as countermeasures for reducing noise. An ever-increasing tendency mainly involves the use of a vibration damping material in sound sources or parts which emit sound accompanying the vibration of the sound sources, and various vibration damping composite metallic sheets have hitherto been proposed in the art.

For example, Japanese Patent Publication No. 12451/1964 discloses a vibration damping metallic sheet wherein a copolymer of vinyl acetate and a maleic diester, a copolymer of vinyl chloride and ethylhexyl acrylate or the like is used as an intermediate layer. This invention utilizes a known fact that vibrational energy is absorbed as a thermal energy through the utilization of a resin having viscoelasticity. In the resin having, viscoelasticity, the vicoelastic sensitivity changes with a change in the temperature, so that it is anticipated that the vibration damping capability can disappear with in a given service temperature range.

In general, the vibration absorbing capability can be expressed in terms of a physical quantity called a loss factor, and it is common knowledge in the art that the material exhibits a vibration absorbing capability when the loss factor is 0.05 or more. Viscoelastic substances, such as rubbers, copolymer resins and asphalt, have been thought to be effective when used as the above-described material. They are satisfactory in vibration damping capability but poor in adhesion to the metallic sheets or the processability for insertion between two sheets of metal, so that no thoroughly satisfactory material has been proposed in the art as yet.

Butyl rubber is excellent in vibration damping capability by virtue of its high hysteresis and best suited for improving the impact strength at a low temperature of other materials. However, it has drawbacks with respect to moldability, compatibility and adhesion.

Japanese Patent Laid-Open No. 291930/1989 discloses:

(1) a vibration damping composite metallic sheet characterized by comprising two sheets of metal and an intermediate layer bonded therebetween the intermediate layer comprising a rubber resin composition comprising a butyl rubber and a polyoctenylene resin and, having blended therewith, a copolymer of an olefin and acrylic acid copolymer, which has a vibration damping capability over a wide temperature range; and (2) a vibration damping composite metallic sheet characterized by comprising two sheets of metal and an intermediate layer bonded therebetween, the intermediate layer comprising a multilayered film or sheet comprising a resin layer comprising a butyl rubber and a polyoctenylene resin and a resin layer comprising a copolymer of an olefin and acrylic acid, and having a vibration damping capability over a wide temperature range.

In view of the above, the present inventors have made extensive and intensive studies with a view of developing a vibration damping composite metallic sheet having a high vibration damping capability which is formed through insertion, between metallic sheets, of a resin composition wherein the above-described various drawbacks of the viscoelastic substances have been eliminated.

SUMMARY OF THE INVENTION

In the present invention a vibration damping sheet comprises two sheets of metal and an intermediate layer inserted between the two sheets of metal which comprises a rubber composition comprising a butyl rubber, polyoctenylene and a copolymer of an olefin and an epoxy-containing acrylic ester.

The rubber composition may further comprise a copolymer of an olefin and an acrylic ester.

The sheet may comprise the two sheets of metal and three intermediate layers, the two outer layers of the three intermediate layers comprising a copolymer of an olefin and an epoxy-containing acrylic ester, the inner layer, inserted between the two outer layers, comprising a butyl rubber and polyoctenylene.

The sheet may comprise the two sheets of metal and three intermediate layers, the two outer layers of the three intermediate layers comprising a copolymer of an olefin and an epoxy-containing acrylic ester, the inner layer, inserted between the two outer layers, comprising a butyl rubber, polyoctenylene and a copolymer of an olefin and an acrylic ester.

The copolymer of an olefin and an epoxy-containing acrylate used in the present invention comprises an olefin copolymerized or grafted with an epoxy-containing acrylate by a known method commonly used in the art, and the content of the epoxy-containing acrylate is preferably 0.1 to 45%, still preferably 1 to 25%. When the content is less than 0.1%, sufficient adhesion cannot be attained. On the other hand, when the content exceeds 45%, its compatibility with the butyl rubber, copolymer of an olefin and an acrylic ester and polyoctenylene resin becomes poor, so that sufficient mechanical strengths cannot be attained.

The butyl rubber used in the present invention is a chemically stable rubber prepared by blending an isobutylene monomer with a small amount of an isoprene monomer and subjecting the blend to cationic copolymerization. The butyl rubber can be a chlorinated or a brominated butyl rubber.

The copolymer of an olefin and an acrylic ester used in the present invention is one prepared by blending an olefin monomer, such as ethylene, propylene or butylene, with a small amount of an acrylic ester or a methacrylic ester and subjecting the blend to copolymerization by a known method. The acrylic or methacrylic ester content is preferably 1 to 50%, more preferably 3 to 30%. When the content is less than 1%, sufficient strengths cannot be attained On the other hand, when the content exceeds 50%, its compatibility with the butyl rubber or polyoctenylene resin is poor, so that sufficient mechanical strength cannot be attained.

The polyoctenylene resin used in the present invention is prepared by polymerizing cyclooctene and should have one double bond per eight carbon atoms and a molecular weight of 10,000 or more. The trans isomer content is 50% or more, preferably 60% or more, and the degree of crystallinity is preferably 10% or more. The polyoctenylene resin usually has a melting point of 40° C. or above, preferably 50° to 60° C. and a glass transition point of −75° to −30° C.

The cyclooctene as a base material constituting the polyoctenylene may be synthesized by various methods, e.g., by dimerizing butadiene and hydrogenating one of the two remaining double bonds.

If necessary, dyes and pigments, various stabilizers, fillers, plasticizers, antioxidants, ultraviolet absorbers, nucleating agents, antistatic agents and flame retardants may be added to the rubbery resin composition as the intermediate layer of the vibration damping composite metallic sheet according to the present invention. The above-described additives include those known as vulcanizing agents, vulcanization accelerators and various additives, such as peroxides, sulfur compounds, phenolic resins, process oils and alicyclic epoxy resins for use with the butyl rubber, copolymer of an olefin and an acrylic ester and polyoctenylene resin.

The resin composition of the present invention may be prepared by melt-mixing the ingredients according to various methods, such as roll milling or extrusion. For example, first the copolymer of an olefin and an epoxy-containing acrylate is melted, and the remaining ingredients, i.e., the butyl rubber, copolymer of an olefin and an acrylic ester and polyoctenylene resin may then be added thereto. Alternatively, the above-described three ingredients may be simultaneously mixed together. If necessary, it is also possible to add in any stage the above-described additives, e.g., fillers, plasticizers and antioxidants. Alternatively, the three ingredients may be solution-mixed through dissolution in a suitable solvent.

The rubbery resin of the present invention comprising a coplymer of an olefin and an epoxy-containing acrylate, a butyl rubber, a copolymer of an olefin and an acrylic ester, and a polyoctenylene resin is molded into a film or sheet by making use of the conventionally known T-die film production apparatus or inflation film production apparatus and then sandwiched between two sheets of metal and laminated under pressure. Alternatively, a film may be directly formed on a metallic sheet by casting In this case, the thickness of the film or sheet is preferably 10 μm to 1 mm, particularly preferably 20 to 150 μm.

The rubbery resin as an intermediate layer comprising a copolymer of an olefin and an epoxy-containing acrylate, a butyl rubber, a copolymer of an olefin and an acrylic ester, and a polyoctenylene resin may be prepared by a method which comprises melt-mixing the ingredients by various methods and molding the mixture into a film or sheet. Alternatively, the ingredients may be directly molded into a two-or multilayered film by making use of a coextruding machine. In this case, when an adhesive layer comprising a copolymer of an olefin and an epoxy-containing acrylate is inserted between the metallic sheet and the rubbery resin film comprising a butyl rubber, a copolymer of an olefin and an acrylic ester and a polyoctenylene resin, the multilayered film causes no blocking between the film surfaces themselves while still maintaining good adhesion to the metallic sheet, which favorably facilitates lamination with a metallic sheet.

Examples of the metallic sheet used in the present invention include those made of iron, nickel, titanium, aluminum, magnesium, copper, zinc and tin and various alloy sheets composed mainly of the above-described metallic sheets, e.g., stainless steel sheets. There is no particular limitation on the thickness of the above-described metallic sheets as far as fabrication such as bending or drawing of the resultant vibration damping composite metallic sheet is possible. In general, the thickness may be 0.01 to 5 mm. The above-described metallic sheets are commercially available. However, since they generally have fats or oils deposited thereon, it is preferred to use them after degreasing. The degreasing may be conducted by any known method.

BRIEF DESCRIPTION OF THE DRAWINGS

FIGS. 3 and 4 are graphs showing the temperature dependency of the loss factors of the materials used in Examples 1 to 6 and Comparative Examples 1 to 4.

In FIG. 1, each of numerals 1 and 1' designates a metallic sheet, each of numerals 2, 2', 3 and 3' a roll, each of numerals 4, 4' and 8 a leveller, each of numerals 5 and 5' a step of preheating, each of numerals 6 and 6' a roll, numeral 9 a step of reheating, numeral 10 a step of first cooling, numeral 11 a step of second cooling, each of numerals 12 and 13 a slitter, numeral 7 a rubbery resin film, and numeral 14 a vibration damping composite metallic sheet as a product. In FIG. 2, numeral 15 designates a roll, each of numerals 16 and 18 an electrolyte cell, numeral 17 an anode plate, numeral 19 a cathode plate, numeral 20 a power supply, numeral 21 a step of washing with water, numeral 22 a step of drying, numeral 23 a metallic sheet before degreasing, and a numeral 24 a metallic sheet after degreasing.

Figure 1:
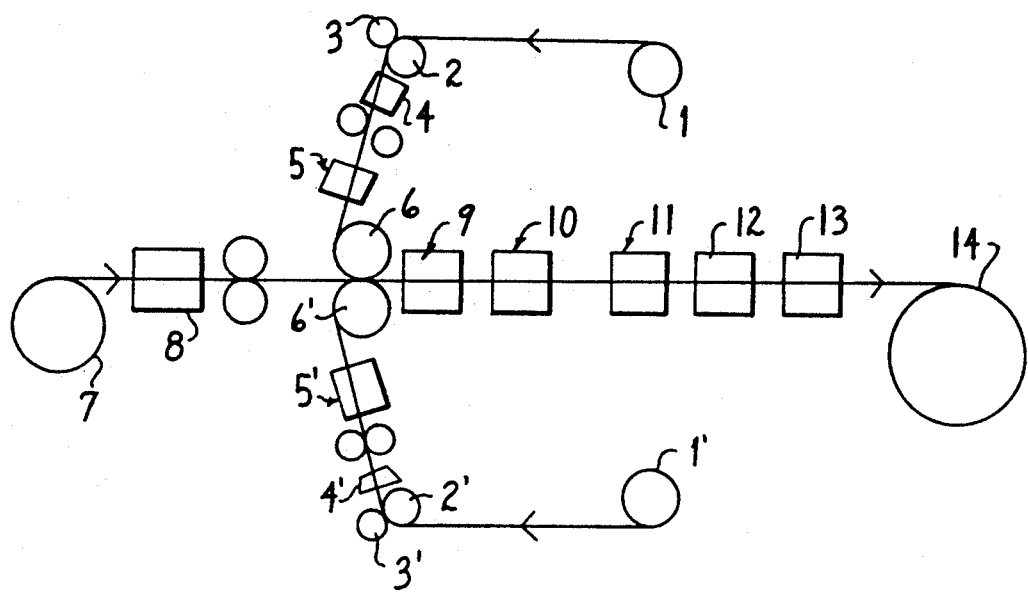
FIG. 1 is a diagram showing a process of continuously producing a vibration damping composite metallic sheet.
Figure 2:
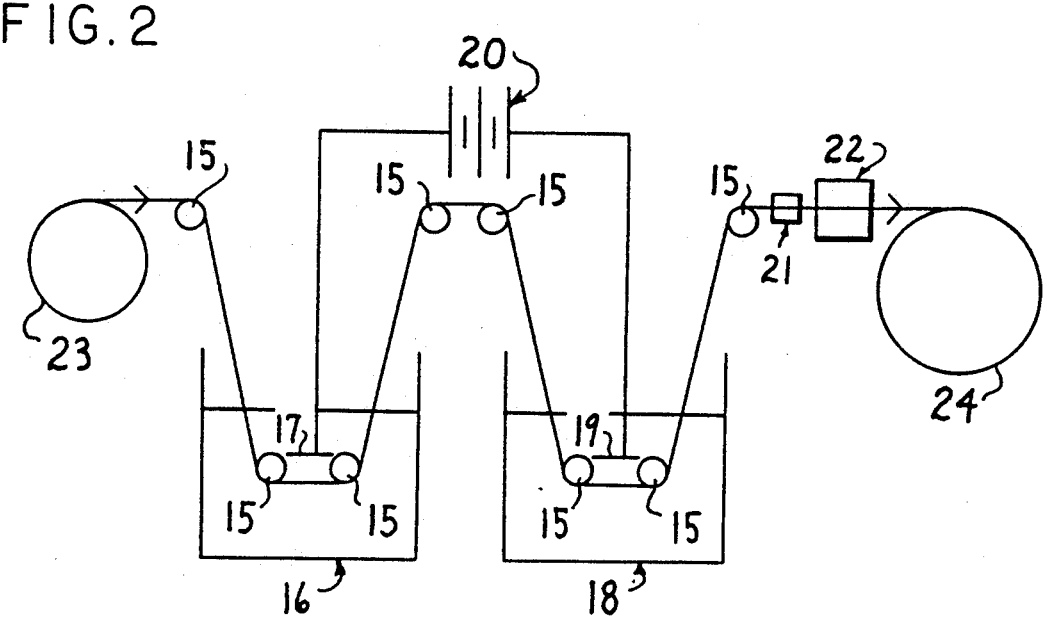
FIG. 2 is a diagram showing a step of continuously degreasing a metallic sheet.

The vibration damping composite metallic sheet of the present invention is preferably produced by inserting a film or sheet of a rubbery resin comprising a copolymer of an olefin and an epoxy-containing acrylate, a butyl rubber, a copolymer of an olefin and an acrylic ester, and a polyoctenylene resin between two sheets of metal of the same or different kind and thermally pressing the resultant assembly by making use of a compression molding machine or rolls. In this case, various methods, such as laminating after cutting each of the metallic sheets and rubbery resin into a size and a shape suitable for the subsequent fabrication and a continuous production method shown in FIG. 1, may be adopted. When the vibration damping composite metallic sheet is produced by the continuous production method shown in FIG. 1, preliminary degreasing of the metallic sheets in a step as shown in FIG. 2 is preferred because good adhesion can be attained thereby.

The vibration damping composite metallic sheet provided by the present invention not only exhibits a good vibration damping capability over a wide temperature range but also is very easy to fabricate because the rubbery resin, as an intermediate layer comprising a copolymer of an olefin and an epoxy-containing acrylate, a butyl rubber, a copolymer of an olefin and an acrylic ester and a polyoctenylene resin, may easily be molded into a film or sheet and further exhibits a good adhesive property.

EXAMPLES

The present invention will now be described in more detail by way of the following Examples. The adhesion between the resin and the metal was evaluated in terms of adhesive strength, and the T-peel strength and the tensile shear strength were measured according to the methods as stipulated by JIS K 6854 and JIS K 6850, respecitviely. The loss factor in FIGS. 3 and 4 was evaluated between 20° and 80° C. for modulus of elasticity by a Bruel & Kjaer modulus of elasticity tester model 2032A.

EXAMPLE 1

A copolymer resin of an olefin and an epoxy-containing acrylate (Rexpearl; a product of Nippon Petrochemicals Co., Ltd.), a butyl rubber (Butyl; a product of Exxon), a copolymer of an olefin and an acrylic ester (Rexlon; a product of Nippon Petrochemicals Co., Ltd.) and a polyoctenylene resin (Vestenamer8012; a product of Hüls) were blended together in proportions specified in Table 1, and the blend was melted and kneaded in an ordinary Banbury mixer and then pelletized. The pellets were molded into a 60 μm-thick film by making use of an ordinary T-die extruder. For the evaluation of the adhesive property, this film was sandwiched between two sheets of iron at 200° C. to form a laminate by making use of an ordinary press molding machine. The test pieces thus formed were allowed to stand in an air-conditioned room kept at a temperature of 23° C. and a relative humidity of 50% for 3 days to measure the T-peel strength, tensile shear strength and loss factor thereof. The results are given in Table 1 and FIG. 1.

EXAMPLE 2

A butyl rubber (Butyl; a product of Exxon), a copolymer of an olefin and an acrylic ester (Rexlon; a product of Nippon Petrochemicals Co., Ltd.) and a polyoctenylene resin (Vestenamer8012; a product of Hüls) were blended together in proportions specified in Table 1, and the blend was kneaded by means of rolls and then pelletized with an ordinary rubber shredder. A 60 μm-thick multilayered film comprising three layers, i.e., a 15 μm-thick layer of a copolymer of an olefin and an epoxy-containing acrylate, a 30 μm-thick layer butyl rubber, a copolymer of an olefin and an acrylic ester and a polyoctenylene resin and a 15 μm-thick layer of a copolymer of an olefin and an epoxy-containing acrylate, wherein said copolymer layers constitute the outer layers, was prepared from the above pellets and a copolymer resin of an olefin and an epoxy-containing acrylate (Rexpearl; a product of Nippon Petrochemicals Co., Ltd.) by means of an ordinary inflation extruder for multilayered film. The formed multilayered film was then sandwiched between two sheets of iron at 200° C. to form a laminate by means of a press molding machine. The test pieces thus formed were allowed to stand in an air-conditioned room kept at a temperature of 23° C. and a relative humidity of 50% for 3 days to measure the T-peel strength, tensile shear strength and loss factor thereof. The results are given in Table 1 and FIG. 3.

COMPARATIVE EXAMPLE 1

The T-peel strength, tensile shear strength and loss factor of comparative test pieces were measured in the same manner as that of Example 1, except that the polyoctenylene resin was omitted. The results are given in Table 1 and FIG. 3. As is apparent from the results, the moldability was very poor.

COMPARATIVE EXAMPLE 2

The T-peel strength, tensile shear strength and loss factor of comparative test pieces were measured in the same manner as that of Example 2, except that the copolymer resin of an olefin and an epoxy-containing acrylate was omitted. The results are given in Table 1 and FIG. 3.

EXAMPLE 3

The T-peel strength, tensile shear strength and loss factor of test pieces were measured in the same manner as that of Example 2, except that in molding the copolymer of an olefin and an epoxy-containing acrylate into a multilayered film together with the butyl rubber, copolymer of an olefin and an acrylic ester and polyoctenylene resin, the copolymer of an olefin and an epoxy-containing acrylate was previously molded into two 10 μm-thick films by means of an ordinary T-die extruder and a 30 μm-thick film comprising a butyl rubber, a copolymer of an olefin and an acrylic ester and a polyoctenylene resin was sandwiched therebetween for lamination, thereby forming a multilayered film. The results are given in Table 1 and FIG. 1.

TABLE 1

|  | Butyl rubber (pts. wt.) | Vestenamer (pts. wt.) | Rexlon (pts. wt.) | Rexpearl (pts. wt.) | T-peel strength (kg/2.5 cm) | Tensile shear strength (kg/cm$^2$) |
| --- | --- | --- | --- | --- | --- | --- |
| Ex. 1 | 25 | 15 | 10 | 50 | 21 | 98 |
| Ex. 2* | 40 | 10 | 10 | 40 | 24 | 104 |
| Ex. 3* | 40 | 10 | 10 | 40 | 32 | 99 |
| Comp. Ex. 1 | 29.4 | — | 11.8 | 58.8 | 6 | 23 |
| Comp. Ex. 2 | 66.6 | 16.7 | 16.7 | — | 8 | 26 |

Note: *three-layered film

EXAMPLE 4

A copolymer resin of an olefin and an epoxy-containing acrylate (Rexpearl; a product of Nippon Petrochemicals Co., Ltd.), a butyl rubber (Butyl; a product of Exxon) and a polyoctenylene resin (Vestenamer8012; a product of Hüls) were blended together in proportions specified in Table 2, and the blend was melted and kneaded in an ordinary Banbury mixer and then pelletized. The pellets were molded into a 60 μm-thick film by making use of an ordinary T-die extruder. For the evaluation of the adhesive property, this film was sandwiched between two sheets of iron at 200° C. to form a laminate by making use of an ordinary press molding machine. The test pieces thus formed were allowed to stand in an air-conditioned room kept at a temperature of 23° C. and a relative humidity of 50% for 3 days to measure the T-peel strength, tensile shear strength and loss factor thereof. The results are given in Table 2 and FIG. 4.

EXAMPLE 5

A butyl rubber (Butyl; a product of Exxon) and a polyoctenylene resin (Vestenamer8012; a product of Hüls) were blended together in proportions specified in Table 2, and the blend was kneaded by means of rolls and then pelletized with an ordinary rubber shredder. A 60 μm-thick multilayered film comprising three layers, i.e., a 15 μm-thick layer of a copolymer of an olefin and an epoxy-containing acrylate, a 30 μm-thick layer of a rubbery resin comprising a butyl rubber and a polyoctenylene resin and a 15 μm thick layer of a copolymer of an olefin and an epoxy-containing acrylate, said copolymer layers constituting the outer layers, was prepared from the above pellets and a copolymer resin of an olefin and an epoxy-containing acrylate (Rexpearl; a product of Nippon Petrochemicals Co., Ltd.) by means of an ordinary inflation extruder for multilayered film. The formed multilayered film was then sandwiched between two sheets of iron at 200° C. to form a laminate by means of a press molding machine. The test pieces thus formed were allowed to stand in an air-conditioned room kept at a temperature of 23° C. and a relative humidity of 50% for 3 days to measure the T-peel strength, tensile shear strength and loss factor thereof. The results are given in Table 2 and FIG. 4.

COMPARATIVE EXAMPLE 3

The T-peel strength, tensile shear strength and loss factor of comparative test pieces were measured in the same manner as that of Example 4, except that the polyoctenylene resin was omitted. The results are given in Table 2 and FIG. 4. As is apparent from the results, the moldability thereof was very poor.

COMPARATIVE EXAMPLE 4

The T-peel strength, tensile shear strength and loss factor of comparative test pieces were measured in the same manner as that of Example 5, except that the copolymer resin of an olefin and an epoxy-containing acrylate was omitted. The results are given in Table 2 and FIG. 4.

EXAMPLE 6

The T-peel strength, tensile shear strength and loss factor of test pieces were measured in the same manner as that of Example 5, except that in molding the copolymer of an olefin and an epoxy-containing acrylate into a multilayered film together with the butyl rubber and polyoctenylene resin, the copolymer of an olefin and an epoxy-containing acrylate was previously molded into two 10 μm-thick films by means of an ordinary T-die extruder and a 30 μm-thick film comprising a butyl rubber and a polyoctenylene resin was sandwiched therebetween for lamination, thereby forming a multilayered film. The results are given in Table 2 and FIG. 4.

TABLE 2

| | Butyl rubber (pts. wt.) | Vestenamer (pts. wt.) | Rexpearl (pts. wt.) | T-peel strength (kg/2.5 cm) | Tensile shear strength (kg/cm$^2$) |
|---|---|---|---|---|---|
| Ex. 4 | 25 | 25 | 50 | 14 | 85 |
| Ex. 5* | 40 | 10 | 50 | 15 | 91 |
| Ex. 6* | 45 | 15 | 40 | 25 | 88 |
| Comp. Ex. 3 | 50 | — | 50 | 4 | 21 |
| Comp. Ex. 4 | 80 | 20 | — | 6 | 27 |

Note: *three-layered film

I claim:
1. A vibration damping sheet comprising two sheets of metal and an intermediate layer interposed therebetween, said intermediate layer comprising a rubber composition containing a butyl rubber, polyoctenylene and a copolymer of an olefin and an epoxy-containing acrylic ester, said copolymer having an epoxy-containing acrylate content of from 0.1 to 45%.
2. The sheet as claimed in claim 1, in which the rubber composition further comprises a copolymer of an olefin and an acrylic ester, the copolymer of an olefin and an acrylic ester having an acrylic ester content of from 1 to 50%.
3. The sheet as claimed in claim 1, wherein three intermediate layers are provided between the two metal sheets, the two outer layers of the three intermediate layers comprising a copolymer of an olefin and an epoxy-containing acrylic ester, the inner layer comprising a butyl rubber and polyoctenylene.
4. The sheet as claimed in claim 1, wherein three intermediate layers are provided between the two metal sheets, the two outer layers of the three intermediate layers comprising a copolymer of an olefin and an epoxy-containing acrylic ester, the inner layer comprising a butyl rubber, polyoctenylene and a copolymer of an olefin and an acrylic ester, the copolymer of an olefin and an acrylic ester having an acrylic ester content of from 1 to 50%.
5. The sheet as claimed in claim 1, wherein the thickness of the intermediate layer is from 10 μm to 1 mm.
6. The sheet as claimed in claim 1, wherein the content of the epoxy-containing acrylate in the copolymer is from 1 to 25%.
7. The sheet as claimed in claim 1, wherein the thickness of the intermediate layer is from 20 to 150 μm.
8. The sheet as claimed in claim 1, wherein the polyoctenylene resin has one double bond per eight carbon atoms, a molecular weight of at least 10,000, a tans isomer content of at least 50%, a degree of crystallinity of at least 10%, a melting point of at least 40° C. and a glass transition point of from −75° to −30° C.
9. The sheet as claimed in claim 2, wherein the acrylic ester content in the copolymer of an olefin ad acrylic ester is from 3 to 30%.
10. The sheet as claimed in claim 8, wherein the polyoctenylene resin has a trans isomer content of at least 60% and a melting temperature of from 50° to 60° C.

* * * * *

UNITED STATES PATENT AND TRADEMARK OFFICE
CERTIFICATE OF CORRECTION

PATENT NO. : 5 232 785
DATED : August 3, 1993
INVENTOR(S) : Masami KITA It is certified that error appears in the above-identified patent and that said Letters Patent is hereby corrected as shown below:

Column 8, line 53 and 54; change "a tans isomer" to ---a trans isomer---.

Column 8, line 58; change "olefin ad acrylic" to ---olefin and an acrylic---.

Signed and Sealed this

Fifteenth Day of March, 1994

Attest:

BRUCE LEHMAN

*Attesting Officer*    *Commissioner of Patents and Trademarks*